United States Patent [19]

Proplesch et al.

[11] 4,081,506
[45] Mar. 28, 1978

[54] METHOD FOR RECOVERING NON-FERROUS METALS FROM HYDRO-THERMAL SLIME

[75] Inventors: Peter Proplesch; Erich Zimmer, both of Julich, Germany

[73] Assignee: Kernforschungsanlage Julich Gesellschaft mit beschrankter Haftung, Julich, Germany

[21] Appl. No.: 702,866

[22] Filed: Jul. 6, 1976

[30] Foreign Application Priority Data

Jul. 5, 1975 Germany .............................. 2530203

[51] Int. Cl.$^2$ .......................... C01G 3/10; C01G 9/06
[52] U.S. Cl. ..................................... 423/41; 423/109; 423/150
[58] Field of Search ......................... 423/41, 45, 109; 75/115, 116, 117, 118, 120

[56] References Cited

U.S. PATENT DOCUMENTS

| 1,443,707 | 1/1923 | Gepp | 75/120 |
| 1,468,806 | 9/1923 | Greenawalt | 423/41 |
| 1,528,209 | 3/1925 | Greenawalt | 75/115 |
| 1,730,584 | 10/1929 | Meyer | 423/41 |
| 2,639,220 | 5/1953 | Thomsen | 423/41 |
| 3,753,691 | 8/1973 | Grover | 75/115 |

FOREIGN PATENT DOCUMENTS 2,010,599  9/1971  Germany .............................. 423/41

OTHER PUBLICATIONS

Degens et al., (Eds.) "*Hot Brines and Recent Heavy Metal Deposits in the Red Sea*", Springer-Verlag, N.Y., (1969) pp. 542–549.

*Primary Examiner*—Earl C. Thomas
*Assistant Examiner*—Brian E. Hearn
*Attorney, Agent, or Firm*—Walter Becker

[57] ABSTRACT

After separating brine from the slime and drying the same with solids therein, dried solids are subjected to roasting in an oxydizing temperature of 350° to 400° C, and then leaching the roasted material with predetermined acid and withdrawing sulfur oxides from waste gases generated during the roasting step.

5 Claims, 3 Drawing Figures

METHOD FOR RECOVERING NON-FERROUS METALS FROM HYDRO-THERMAL SLIME

The present invention relates to a method of recovering non-ferrous metals from hydrothermal slime, according to which after separation of the brine and after the solids of the slime have been dried, the solids are ground, roasted, and subsequently leached.

Hydrothermal slimes are recovered from their natural places of deposit on the bottom of the sea as highly concentrated saline solutions with approximately 10% by weight of solids. The solids are suspended very finely in the solution. Of economic interest are in particular the metal contents of said solids, especially the content in copper, zinc and silver. Solids, which have been washed free of salt and have been dried, contain about 30% of iron, 5% of zinc, 1% of coppper and 0.01% of silver and 2.5% of calcium. The metals are present in the form of oxides, hydroxides, sulfides, carbonates, and sulfates. The sulfide-sulfur content of the solids amounts to about 5%. A number of methods have become known for refining hydrothermal slime. Thus, German Auslegeschrift No. 2145861 discloses a wet chlorinating method according to which the leaching of the sulfides is effected by means of a solution containing a metal chloride, and by introducing gaseous chlorine. The drawback of this method consists in the high chlorine consumption and in the high degree of dissolving of the undesired iron which in the occurring form is without value and interferes with the recovery of the non-ferrous metals.

German Offenlegungsschrift No. 2010599, German Offenlegungsschrift No. 2017173 and German Offenlegungsschrift No. 2110798 disclose methods according to which the metals contained in the hydrothermal slime are obtained after an oxidizing chlorinating or sulfatizing, roasting and subsequent leaching. These methods, however, are primarily in addition to the recovery of non-ferrous metals directed to the recovery of iron. After the transformation of the metals in the roasting process, tower acid or tower liquid (turmsaure) is introduced for leaching, in which the major portion of the metals will be dissolved. By tower acid or tower liquor is meant an acid which contains $H_2O$, $SO_2$, $HCl$, $SO_3$ and $H_2SO_4$. The separation of the metals from the solution is effected selectively in a metallurgical manner. Also with these methods, the iron content in the hydrothermal slime is encompassed in the recovering process which fact makes the recovery of economically valuable non-ferrous metals rather expensive.

The German Offenlegungsschrift No. 2229778 conveys the teaching to roast in a chlorinating manner the hydrothermal slime by means of roasted pyrite while taking advantage of the high salt content of said slime, and selectively to leach the roasted matter by treating it with acids. The hydrothermal slime lifted off from the bottom of the sea is filtered, dried and subsequently finely ground prior to the roasting process. For the desired use of the hydrothermal slime it is, however, disadvantageous that for the resulting process it is necessary to add from 2 to 4 parts of roasted pyrite to a portion of the dried hydrothermal slime.

It is, therefore, an object of the present invention to provide a method which will assure the recovery of non-ferrous metals from hydrothermal slime in a simple manner.

It is another object of this invention to provide a method as set forth in the preceding paragraph according to which the undesired dissolving of the iron during the recovery of the non-ferrous metals will be suppressed, while the method itself will be economical.

These objects and other objects and advantages of the invention will appear more clearly from the following specification in connection with the accompanying drawings, in which:

Figure 1:
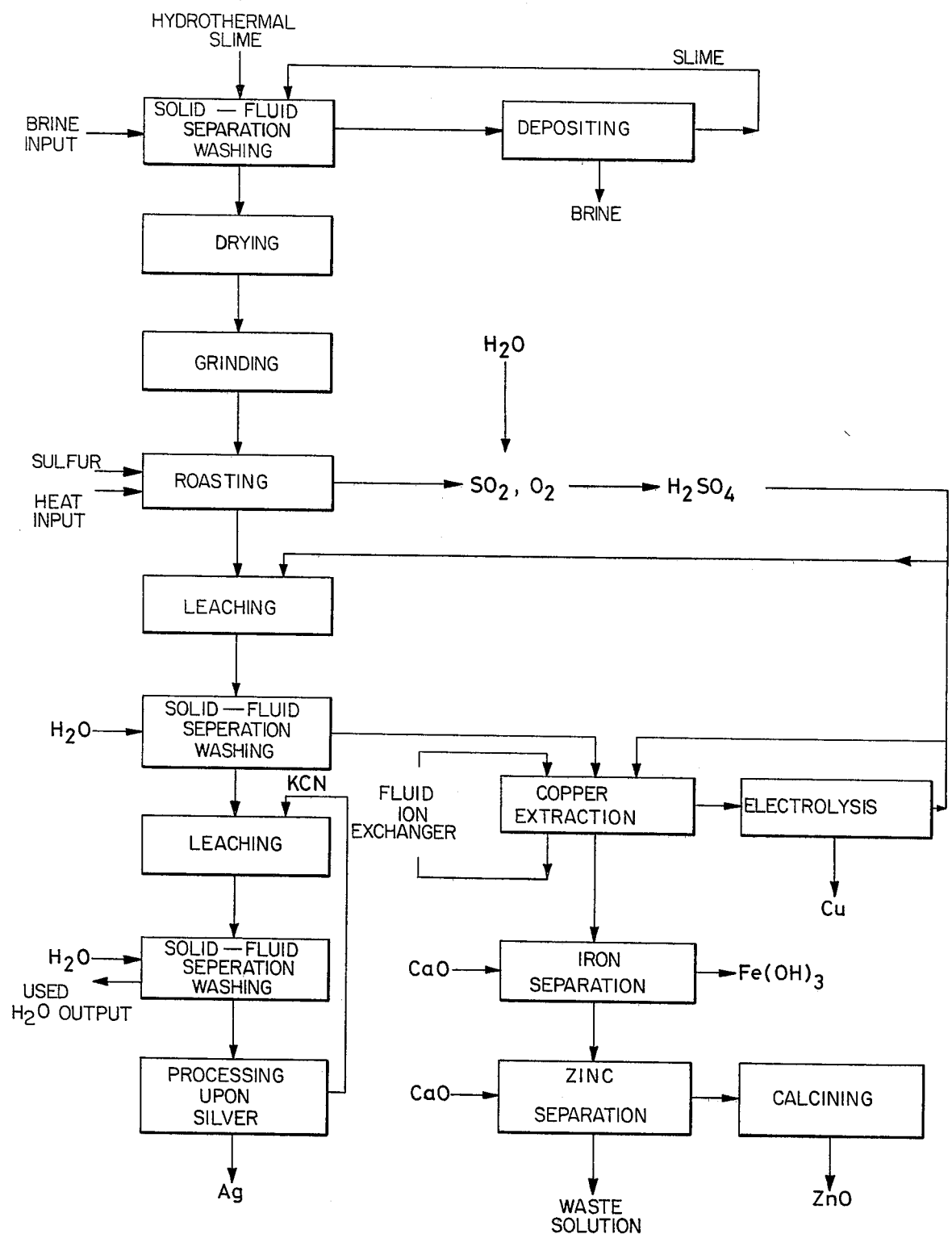
FIG. 1 represents a flow sheet showing the recovery installation according to the present invention with an oxidizing roasting.

The method according to the present invention is characterized primarily in that the ground hydrothermal slime is roasted in an oxidizing manner at a temperature of from 350° to 400° C and that the roasted material is leached with dilute sulfuric acid which is obtained at least in part by converting the sulfur oxides obtained in the waste gas during the roasting process, into sulfuric acid. The roasting temperature which with the method according to the invention is maintained relatively low within the temperature range of from 350° to 400° C, brings about that the iron content in the hydrothermal slime will after the roasting process and while being leached with dilute sulfuric acid, be dissolved only to a minor extent so that substantially the nonferrous metals are selectively dissolved.

According to the method of the present invention, furthermore advantage is taken of the sulfur oxides which advantageously form during the resulting process and escape with the waste gas. By converting the sulfur oxides into sulfuric acid, a portion of the sulfuric acid required for the leaching process is thus automatically created by the processing of the hydrothermal slime.

A modification of the invention consists in that the finely ground hydrothermal slime is while having added thereto from 5 to 15% by weight of sulfur, is roasted in a sulfurizing manner at a temperature from 400° to 450° C and is leached with water. The sulfur required for the sulfurizing roasting is added to the ground hydrothermal slime prior to the roasting process. Also according to this method, at lower roasting temperature and without the otherwise customary increase in temperature at the end of the roasting process for disintegrating the iron sulfate, the iron contained in the roasting material is dissolved only to a minor extent during the leaching process. With this modification of the invention it is especially advantageous that for converting the metals into solid substances of the hydrothermal slime, merely sulfur is required and that sulfuric acid is obtainable as by-product during the roasting by converting the sulfur oxides contained in the waste gas.

According to a further modification of the method according to the invention, it is provided in a sulfurizing manner to roast a portion of the finely ground hydrothermal slime while adding thereto from 5 to 15% of sulfur at a temperature of from 400° to 450° C and to leach with water, and to roast in an oxidizing manner the other portion of the fine ground hydrothermal slime at a temperature of 350° to 400° C and to leach with diluted sulfuric acid while the sulfuric acid is obtained by converting the sulfur oxides obtained in the waste gas during the oxidizing roasting, into sulfuric acid. With this modification of the invention, the entire sulfuric acid required during the leaching of the material roasted in an oxidizing manner is obtained directly while carrying out the method of the invention. This greatly increases the economy of the method of recovering non-ferrous metals from hydrothermal slime. An optimum division of the quantity of slime will be appropriate when one portion is roasted in a sulfatizing manner and two portions of the slurry are roasted in an oxidizing manner. For the roasting and leaching process, as raw material not directly available at the mining site, merely sulfur is required in a quantity which is sufficient for the leaching of the material roasted in an oxidizing manner which quantity of sulfuric acid cannot be obtained.

A further development of the method according to the invention during the oxidizing roasting of the ground hydrothermal slime consists in that for leaching the roasted material there is added an 0.8 to 1 molar sulfuric acid in such a quantity that after the leaching there will be obtained in the solution a pH value of from 1.6 to 2. In this way only a very slight portion of iron will dissolve. The solution will be refined to obtain copper and zinc. From the residue of the leaching, sulfur will be obtained by employing cyanide leaching. It is advantageous to electrolytically recover the copper contained in the solution and to employ the freed sulfuric acid for leaching the roasted material. The sulfuric acid lye obtained during the electrolysis is in view of its residual content in copper, also during a solely sulfatizing roasting according to the second modification of the invention added to the leaching process. With a sulfatizing roasting, preferably 10% by weight of sulfur is added to the ground hydrothermal slime. A particularly favorable recovery of the non-ferrous metals contained in the hydrothermal slime will be obtained when the ground hydrothermal slime contains a maximum granular size which is less than 1 mm.

DETAILED DESCRIPTION

Figure 3:
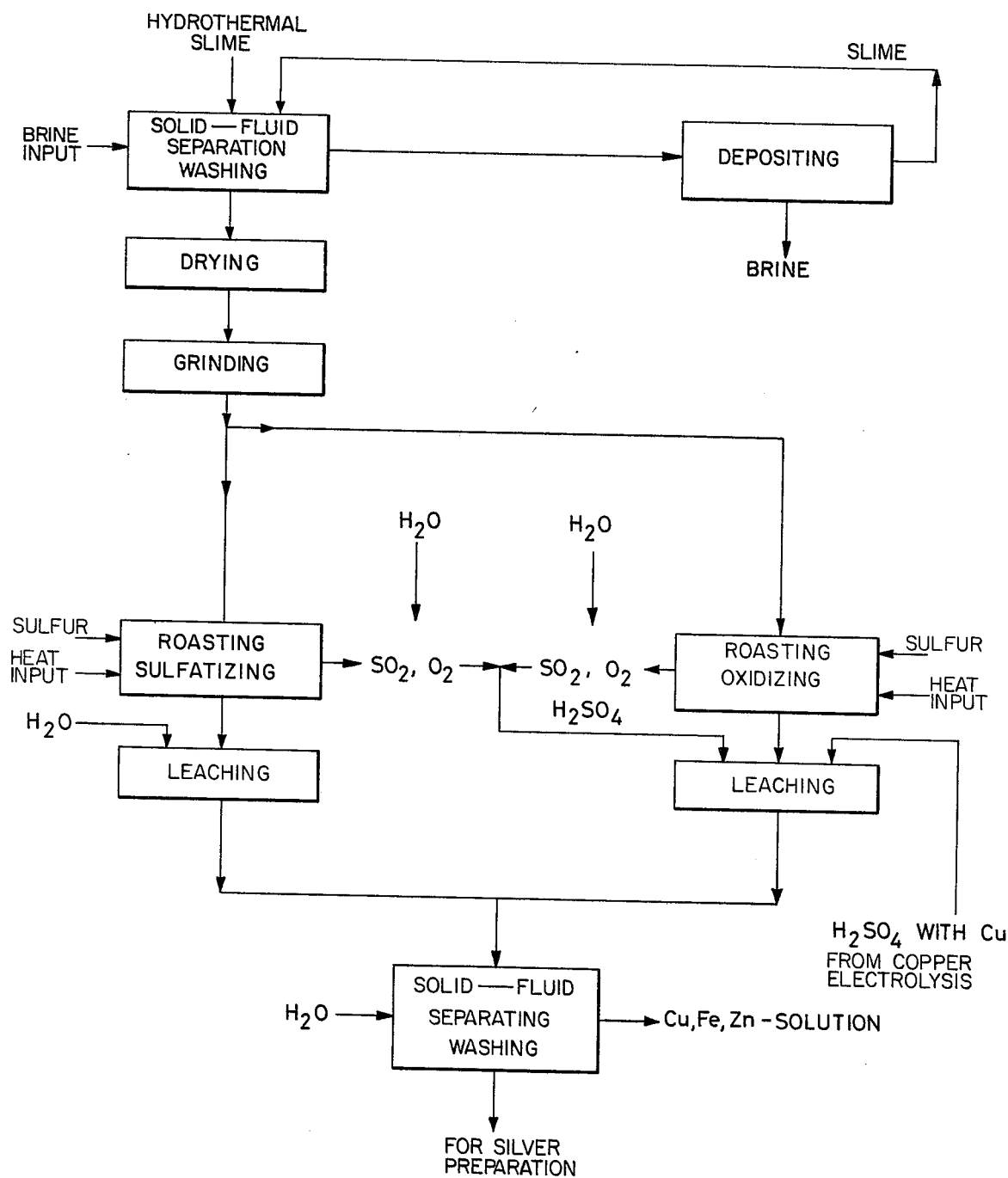
FIG. 3 represents a flow sheet of a recovering plant according to the invention with a sulfatizing and an oxidizing roasting.

Referring now to the drawings in detail, it will be seen from the drawing that in conformity with the method of the present invention, the following method steps are carried out after the hydrothermal slime has been lifted up from the bottom of the sea: solid-liquid separation (filtration), drying, diminution, roasting, and leaching. Following the leaching process, the metals are recovered in a manner known per se which recovery is carried out in the same manner with all embodiments described herein. In FIG. 3, therefore, the method steps following the leaching of the roasted material have been omitted.

Figure 2:
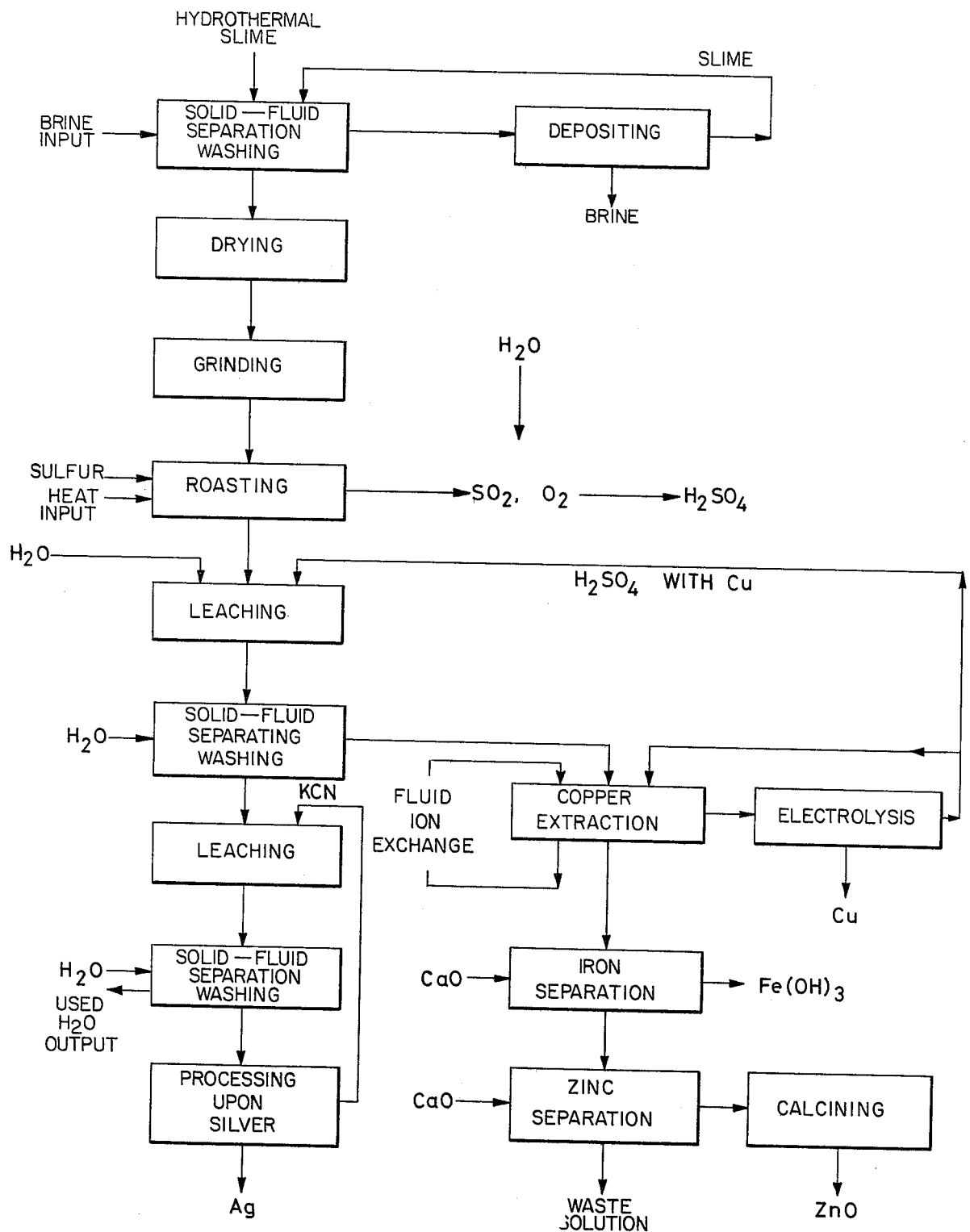
FIG. 2 represents a flow sheet of a recovering plant according to the invention with sulfatizing roasting.

The embodiments of FIGS. 1 to 3 differ from each other by the roasting and leaching of the ground hydrothermal slime, depending on the modification of the method according to the invention. According to the embodiment of FIG. 1, oxidizing roasting is carried out and the leaching is effected by the addition of sulfuric acid. In the embodiment according to FIG. 2, a sulfatizing roasting is carried out while sulfur is being added, and the leaching is effected with water. When carrying out the method according to the flow sheet of FIG. 3, a portion of the ground material is roasted in a sulfatizing manner and is leached with water whereas the other part is roasted in an oxidizing manner, and the leaching is effected with sulfuric acid.

The sulfur oxides obtained during the oxidizing roasting according to the first embodiment of the invention, and contained in the waste gas is converted into sulfuric acid which then in a 0.8 molar concentration is introduced for leaching the roasted material. For purposes of recovering the sulfuric acid, according to the specific embodiment shown the waste gas is passed over adsorbents such as active carbon with activity-increasing metallic additions. While water continuously passes through nozzle means to the adsorbents, in the presence of oxygen, sulfuric acid wil form at said adsorbents. The molarity of the sulfuric acid is set correspondingly. A further portion of the quantity of sulfuric acid required for leaching is obtained during the electrolytic recovery of copper. The residual portions of the required sulfuric acid has to be furnished.

Also when carrying out the method according to the second and third modifications of the invention (FIGS. 2 and 3), the sulfur oxides formed during the roasting process are converted into sulfuric acid. In this connection, when a sulfatizing roasting is effected, the sulfur oxides are processed to form sulfuric acid, in conformity with the so-called contact method.

Following the leach of the roasted substance, the copper and zinc which have been dissolved are separated from silver in the residue. The solid-liquid separation is effected while adding wash water. From the solution, during the first method step copper is extracted which is subsequently thereto recovered according to the electrolytic method.

To the residual solution, CaO is added in order to precipitate the iron as iron hydroxide, which iron has dissolved to a minor extent in the solution. The content in zinc of the solution is obtained by a further precipitation with CaO and by subsequent calcining is obtained as zinc oxide. The silver is obtained by cyanide leaching from the residue obtained during the leaching of the roasted substance.

In the specific examples listed, hydrothermal slime was processed by means of a solid concentration of 10.6%. For separating the solids, drum filters with a filter layer of narrow mesh metallic weave were employed. During the filtration, a high salt content of the solids was reduced to a great extent by washing with sea water. The separated solids were air dried and subsequently were ground fine. The end product had granular sizes of less than 100 μm. The solid concentration amounted to 12%.

A portion of the ground hydrothermal slime was roasted (FIG. 1) in an oxidizing manner. In this connection, while continuously agitating the material and continuously adding air, a roast temperature was maintained of from 350° to 380°. The roasting period amounted to 150 minutes while a decrease in the weight of 5% was obtained. Subsequently, the material was leached by a 0.8 molar sulfuric acid over a time period of 15 minutes and at a temperature of from 80° to 90° C. To each kg of roasting material, there was added 1.6 liters of 0.8 molar sulfuric acid. The pH value of the solution after leaching amounted to 1.7. During the processing of the solution to obtain copper and zinc, the metals referred to in the starting value in the solids were recovered at the following weight percentages: copper 72%; zinc 87%, iron 3.6%. From the residue of the leaching when employing cyanide leaching, the following metals were referred to in the starting value—obtained additionally: Ag 65%; copper 6%; zinc 2%; iron 0%. A further portion of the solid material ground to a granular size of less than 100 μm was according to the second embodiment of the method of the invention roasted in a sulfatizing manner. Prior to the roasting the material was mixed with 10% sulfur. The material was while being continuously agitated and while air was continuously conveyed through, roasted for 150 minutes at a temperature of 450° C while the drop in weight likewise amounted to 5%. For purposes of leaching the material at a temperature of from 80° to 90° C, 1.6 liters of water were added to each kg of material to be roasted. After a leaching period of 15 minutes and processing of the solution, the following quantities of metal were obtained: copper 75%; zinc 85%; iron 4.5% by weight. After leaching the precipitate with cyanide lye which precipitate formed during the leaching with water, the metals were recovered in the same quantity as described in the above mentioned embodiment.

When practicing the method according to the third embodiment of the invention (FIG. 3) a portion of the hydrothermal slime which was ground to a granular size of less than 100 μm, was roasted in a sulfatizing manner. The other part of the ground hydrothermal slime was roasted in the oxidizing manner. As stated previously, an optimum division of the quantity of slurry will be appropriate when one portion is roasted in a sulfatizing manner and two portions of the slurry are roasted in an oxidizing manner. The sulfuric acid recovered from the sulfur oxide contents of the waste gases during both roasting processes was employed for leaching the material which was roasted in the oxidizing manner. The partial quantities roasted in the sulfurizing and oxidizing manner were under consideration of the addition of sulfur so set that the generated quantity of sulfuric acid freed during the electrolytic recovery of copper was sufficient in order to leach the material roasted in an oxidizing manner, with 0.8 molar sulfuric acid. The recovery of metal after the processing of the solution and the residue corresponded to the recovery of metal of the preceding embodiments.

It is, of course, to be understood that the present invention is, by no means, limited to the specific showing in the drawings, but also comprises any modifications within the scope of the appended claims.

What we claim is:

1. A method of recovering non-ferrous metal from hydrothermal slimes containing metals selected from the group of Fe, Zn, Cu, and Ag, which includes the steps of: separating the brine from the slime, drying the thus obtained slime with the solids therein, grinding the dried solids, feeding from 5 to 15% by weight of sulfur to one portion of said ground slime and roasting same in a sulfatizing manner at a temperature of from 400° to 450° C and leaching the thus roasted one portion of the thus obtained slime with water; roasting the other portion of said ground slime in an oxidizing manner at a temperature of from 350° to 400° C, and leaching the thus treated other portion with diluted sulfuric acid, at least a portion of said sulfuric acid being obtained by conversion of sulfur oxides into sulfuric aicd, which sulfur oxides are contained in the waste gas and formed therein during said sulfatizing and oxidizing roasting.

2. A method according to claim 1, which includes the step of that following the oxidizing roasting a from 0.8 to 1-molar hydrosulfuric acid is fed to the roasted material in such a quantity that after effected leaching a pH-value of from 1.6 to 2 is obtained in the solution.

3. A method according to claim 1, which includes the employment of sulfuric acid free from hydrolytically recovering copper for leaching the roasted material.

4. A method according to claim 1, which includes the step of adding 10% by weight of sulfur to slime intended to be roasted in a sulfatizing manner.

5. A method according to claim 1, which includes the step of grinding the slime so that the ground slime body has a granular size of less than 1 mm.

* * * * *